US010968039B2

United States Patent
Duppong (10) Patent No.: US 10,968,039 B2
(45) Date of Patent: Apr. 6, 2021

(54) STORAGE DECKS AND STORAGE RACK ASSEMBLIES INCLUDING SAME

(71) Applicant: J&L Wire Cloth, LLC, St. Paul, MN (US)

(72) Inventor: James A. Duppong, Lake Elmo, MN (US)

(73) Assignee: J&L Wire Cloth, LLC, St. Paul, MN (US)

( * ) Notice: Subject to any disclaimer, the term of this patent is extended or adjusted under 35 U.S.C. 154(b) by 0 days.

(21) Appl. No.: 16/941,270

(22) Filed: Jul. 28, 2020

(65) Prior Publication Data
US 2021/0032024 A1 Feb. 4, 2021

Related U.S. Application Data

(60) Provisional application No. 62/880,051, filed on Jul. 29, 2019.

(51) Int. Cl.
| | | |
|---|---|---|
| *B65G 1/02* | (2006.01) | |
| *A47B 96/14* | (2006.01) | |
| *A47B 96/02* | (2006.01) | |
| *A47B 55/02* | (2006.01) | |

(52) U.S. Cl.
CPC ............. *B65G 1/02* (2013.01); *A47B 55/02* (2013.01); *A47B 96/021* (2013.01); *A47B 96/1441* (2013.01); *A47B 96/1466* (2013.01)

(58) Field of Classification Search
CPC ......... B65G 1/02; A47B 55/02; A47B 96/021; A47B 96/1441; A47B 96/1466
See application file for complete search history.

(56) References Cited

U.S. PATENT DOCUMENTS

| | | | |
|---|---|---|---|
| RE13,914 E | 5/1915 | Dunderdale | |
| 1,600,757 A | 9/1926 | Foster | |
| 2,562,497 A | 7/1951 | Klein | |
| 2,680,522 A | 6/1954 | Temple | |
| 2,850,172 A | 9/1958 | Beckner | |
| 2,913,128 A * | 11/1959 | Milner | A47B 55/02 108/181 |
| 2,919,816 A | 1/1960 | Maslow | |

(Continued)

FOREIGN PATENT DOCUMENTS

| | | | | |
|---|---|---|---|---|
| FR | 1325497 A | * | 4/1963 | ............. A47B 55/02 |
| FR | 1533343 A | * | 7/1968 | ............. A47B 55/02 |
| FR | 2991971 A1 | * | 12/2013 | ........... A47B 96/021 |

*Primary Examiner* — Stanton L Krycinski
(74) *Attorney, Agent, or Firm* — Dugan Law Office, LLC (57) ABSTRACT

A storage deck section supportable on a storage rack structure. The storage deck section includes a deck sheet formed from a plurality of wires. At least some of the plurality of wires include a sheet portion at least partially defining an approximately planar support area for supporting associated goods. A relief portion extending from the sheet portion at an acute angle relative to the approximately planar support area. An extension portion disposed along the first end is oriented transverse to the sheet portion. A support member is disposed below the deck sheet, which is secured to a beam with an elongated open channel such that at least part of the relief portion and at least part of the extension portion are disposed within the elongated open channel. A storage rack assembly is also included.

20 Claims, 8 Drawing Sheets

(56) References Cited

U.S. PATENT DOCUMENTS

| | | | |
|---|---|---|---|
| 2,919,817 A | 1/1960 | Maslow | |
| 3,097,615 A * | 7/1963 | Ross | A47B 55/02 108/155 |
| 3,101,148 A | 8/1963 | Brown | |
| 3,137,249 A * | 6/1964 | Postula | A47B 55/02 108/27 |
| 3,148,638 A | 9/1964 | Shelor | |
| 3,154,028 A * | 10/1964 | Hamilton | A47B 55/02 108/60 |
| 3,225,720 A | 12/1965 | Maslow | |
| 3,270,404 A | 9/1966 | Andreassen | |
| 3,297,374 A | 1/1967 | Radek | |
| 3,316,864 A | 5/1967 | Maslow | |
| 3,481,486 A | 12/1969 | Squires | |
| 3,756,680 A | 9/1973 | Lemer | |
| 3,763,794 A | 10/1973 | Fleck | |
| 3,773,184 A | 11/1973 | Brennan | |
| 3,777,673 A | 12/1973 | Blazey | |
| 3,788,209 A * | 1/1974 | Artar | A47J 43/18 99/349 |
| 3,870,157 A | 3/1975 | Hayward | |
| 3,993,002 A | 11/1976 | Stroh | |
| 4,216,729 A * | 8/1980 | Schrader | A47B 96/024 108/159 |
| 4,267,931 A | 5/1981 | Belotta | |
| 4,558,647 A | 12/1985 | Petersen | |
| 4,603,781 A | 8/1986 | Ryan, Jr. | |
| 4,656,952 A | 4/1987 | Schweizer | |
| 4,778,066 A | 10/1988 | Stjernberg | |
| 4,805,785 A | 2/1989 | Pfeifer | |
| 4,955,490 A | 9/1990 | Schafer | |
| 4,981,225 A | 1/1991 | Cole | |
| 5,251,973 A | 10/1993 | Hazan | |
| 5,477,789 A | 12/1995 | Von Gunten | |
| 5,477,971 A | 12/1995 | Howard | |
| 5,601,038 A | 2/1997 | Welch | |
| 5,695,080 A | 12/1997 | Martin | |
| 5,695,081 A | 12/1997 | Alkalay | |
| 5,779,069 A * | 7/1998 | Scully | A47B 96/02 211/153 |
| 6,241,107 B1 | 6/2001 | Boyer | |
| 6,409,031 B1 * | 6/2002 | Wynne | A47B 55/02 108/181 |
| D459,926 S * | 7/2002 | Mikich | D6/513 |
| 6,422,406 B1 | 7/2002 | Kessel | |
| D470,353 S * | 2/2003 | Mikich | D6/513 |
| 6,578,720 B1 | 6/2003 | Wang | |
| 6,749,208 B2 | 6/2004 | Orozco | |
| 6,802,146 B2 | 10/2004 | Gay | |
| D525,811 S * | 8/2006 | Nawrocki | D6/513 |
| D526,519 S * | 8/2006 | Nawrocki | D6/566 |
| 7,100,780 B1 | 9/2006 | VanCalbergh | |
| 7,152,535 B2 * | 12/2006 | Mikich | A47B 5/00 108/42 |
| 7,188,740 B2 | 3/2007 | Marchetta | |
| D553,401 S * | 10/2007 | Peddycord | D6/513 |
| 7,334,692 B2 | 2/2008 | Black | |
| 7,357,262 B2 * | 4/2008 | Fratilla | A47B 47/02 211/117 |
| 7,540,510 B2 | 6/2009 | Sparkowski | |
| 7,810,438 B2 * | 10/2010 | Ryberg | A47B 96/024 108/42 |
| 7,832,572 B2 | 11/2010 | Wyatt | |
| D637,427 S * | 5/2011 | Troyner | D6/705.6 |
| 8,117,970 B1 | 2/2012 | Baez | |
| D657,979 S | 4/2012 | Sokol | |
| 8,196,761 B2 * | 6/2012 | Morandi | A47B 47/024 211/186 |
| 8,245,651 B1 * | 8/2012 | Mikich | A47F 5/01 108/42 |
| 8,371,458 B2 * | 2/2013 | Yu | A47F 5/0892 211/117 |
| 8,443,992 B2 * | 5/2013 | Lawson | A47B 47/028 211/190 |
| 8,499,942 B1 * | 8/2013 | Coretti, Jr. | A47B 96/021 211/59.2 |
| 8,511,486 B2 * | 8/2013 | Mansor | A47B 43/003 211/117 |
| 8,631,965 B2 | 1/2014 | Leasure | |
| D701,405 S * | 3/2014 | Pace | D6/675.2 |
| 8,695,816 B2 * | 4/2014 | Troyner | A47B 96/14 211/191 |
| 9,027,767 B2 * | 5/2015 | Buckley | A47B 47/0083 211/134 |
| 9,215,931 B1 * | 12/2015 | Offerman | A47B 96/02 |
| 9,375,102 B2 * | 6/2016 | Troyner | A47B 57/402 |
| 9,380,875 B2 * | 7/2016 | Caldwell | A47B 96/021 |
| 9,386,855 B2 * | 7/2016 | Sabounjian | A47B 96/14 |
| 9,420,884 B2 * | 8/2016 | Newman | F16M 13/027 |
| 9,474,369 B1 * | 10/2016 | Tsai | A47F 5/10 |
| D781,063 S * | 3/2017 | Shah | D6/513 |
| 9,629,455 B2 * | 4/2017 | Shah | A47F 5/0892 |
| 9,661,921 B1 * | 5/2017 | Tsai | A47B 47/0083 |
| 9,700,137 B2 | 7/2017 | Davis | |
| 9,713,379 B1 * | 7/2017 | Tsai | A47B 47/0083 |
| 9,737,141 B2 | 8/2017 | Johnson | |
| 9,987,876 B1 | 6/2018 | Tuang | |
| 10,021,856 B2 | 7/2018 | Duppong | |
| 10,098,458 B2 * | 10/2018 | Lindmark | B65D 19/0097 |
| 10,214,351 B2 * | 2/2019 | Duppong | A47B 47/021 |
| 10,299,594 B2 * | 5/2019 | Liss | A47B 55/00 |
| D864,494 S | 10/2019 | Duppong | |
| 10,681,978 B2 * | 6/2020 | Lim | A47B 87/008 |
| 10,806,251 B2 * | 10/2020 | Liss | A47B 47/021 |
| 10,806,257 B1 * | 10/2020 | Liu | A47B 96/021 |
| 10,836,576 B2 * | 11/2020 | Duppong | A47B 96/20 |
| 2002/0023888 A1 * | 2/2002 | Wynne | A47B 96/025 211/119 |
| 2002/0130098 A1 | 9/2002 | Simard | |
| 2002/0134744 A1 | 9/2002 | Kessell | |
| 2002/0162813 A1 | 11/2002 | Hall | |
| 2004/0007550 A1 | 1/2004 | Leeman | |
| 2006/0157435 A1 | 7/2006 | Oberhaus | |
| 2007/0023376 A1 | 2/2007 | Black | |
| 2007/0119805 A1 * | 5/2007 | Nawrocki | A47B 55/02 211/119 |
| 2007/0175371 A1 | 8/2007 | Wyatt | |
| 2007/0205172 A1 | 9/2007 | Stitchick | |
| 2008/0006595 A1 | 1/2008 | Black | |
| 2008/0073303 A1 | 3/2008 | Li | |
| 2009/0272706 A1 | 11/2009 | Gusdorf | |
| 2011/0240571 A1 | 10/2011 | Ho | |
| 2011/0290750 A1 | 12/2011 | Lim | |
| 2012/0304592 A1 | 12/2012 | McKinney | |
| 2013/0098856 A1 | 4/2013 | Troyner | |
| 2013/0248290 A1 | 9/2013 | Kreller | |
| 2014/0353271 A1 | 12/2014 | Kruse | |
| 2015/0313357 A1 | 11/2015 | David | |
| 2015/0359335 A1 | 12/2015 | Offerman | |
| 2016/0007740 A1 | 1/2016 | Consaul | |
| 2016/0073774 A1 | 3/2016 | Lim | |
| 2017/0208947 A1 * | 7/2017 | Tsai | A47B 47/0083 |
| 2018/0084912 A1 * | 3/2018 | Yu | A47B 47/021 |
| 2019/0208904 A1 * | 7/2019 | Yu | A47B 57/581 |
| 2019/0290000 A1 * | 9/2019 | Davis | A47B 57/34 |
| 2020/0163455 A1 * | 5/2020 | Liss | A47B 57/485 |

* cited by examiner

STORAGE DECKS AND STORAGE RACK ASSEMBLIES INCLUDING SAME

This application claims priority from U.S. Provisional Patent Application No. 62/880,051, filed on Jul. 29, 2019, the entire disclosure of which is hereby incorporated by reference herein.

BACKGROUND

The subject matter of the present disclosure broadly relates to the art of storage and shelving systems and, more particularly, to storage decks dimensioned for support on an associated storage rack as well as storage rack assemblies that include one or more of such storage decks.

Known storage and shelving systems commonly include a storage rack that is supported on a base surface, such as the floor of a building or the paved yard of an outside storage facility, for example. The storage rack is typically constructed from numerous structural columns and beams or rails that together form one or more storage bays that are elevated from the base surface. A storage deck is normally supported on the storage rack within each bay and functions as a support surface for the items and materials that are supported on the storage and shelving system. In many cases, the items and materials are palletized to facilitate transfer of the items and materials onto and off of the support surfaces.

Known storage and shelving systems are often arranged such that multiple bays are positioned adjacent one another. In some cases, storage decks in adjacent bays can be supported on or along a common beam or rail. In some conventional constructions, storage racks can be formed from beams or rails having a rectangular or other closed cross-sectional profile. In such constructions, storage decks can simply be positioned over top of front and rear beams or rails. However, in some constructions other structural shapes may be used for the beams or rails of the storage racks. In such constructions, however, overlapping portions of the storage decks undesirably result in the formation of a height differential that can increase the difficulty of transferring items and materials on and off of the storage decks. Additionally, such constructions can lead to increased time and/or difficulty in installation and assembly of the shelving systems.

Notwithstanding any commercial success of conventional designs, it is believed that a need exists to overcome the foregoing and/or other disadvantages of known constructions while still retaining comparable or, preferably, improving factors such as performance, ease of manufacture, ease of assembly, ease of installation and/or reduced cost of manufacture. Thus, it is believed to be generally desirable to develop new constructions and/or designs that may advance the art of storage decks and storage rack assemblies that include the same.

BRIEF SUMMARY

One example of a storage rack assembly in accordance with the subject matter of the present disclosure can be disposed on an associated base surface and having a front side and a rear side. The storage rack assembly can include a storage rack structure including a plurality of columns and a plurality of beams extending between and interconnecting the plurality of columns such that a storage bay is formed at a non-zero height above the associated base surface. One of the plurality of beams can include an uppermost surface portion and an elongated open channel with an inner surface portion facing inward toward the storage bay. A storage deck section can be supported on the storage rack structure within the first storage bay. The storage deck section can include a deck sheet and a support member. The deck sheet can include a plurality of deck wires as well as first and second edge wires. The plurality of deck wires can extend lengthwise between a first end and a second end opposite the first end. At least some of the plurality of deck wires can include a sheet portion at least partially defining an approximately planar support area for supporting associated goods with the approximately planar support area disposed in approximate alignment with the uppermost surface portion of the one of the plurality of beams. A relief portion can extend from the sheet portion in a direction toward the first end and at an acute angle relative to the approximately planar support area at least partially defined by the sheet portion of the plurality of deck wires. An extension portion can be disposed along the first end and oriented transverse to the sheet portion with substantially all of the extension portion along the first end of the plurality of deck wires is disposed within the elongated open channel of the one of the plurality of beams. The first edge wire and the second edge wire can be spaced apart in a lengthwise direction of the extension portion of the plurality of deck wires. The first and second edge wires can extend transverse to the sheet portion and the extension portion along at least the first end of the plurality of deck wires with the first and second edge wires extending between and interconnecting the extension portion of the plurality of deck wires. The first edge wire can include a first outer tangential extent and a first inner tangential extent. The second edge wire can include a second outer tangential extent and a second inner tangential extent. The first and second outer tangential extents of the first and second edge wires can be disposed in abutting engagement with the inner surface portion of the elongated open channel of the one of the plurality of beams. A support member can be disposed below at least the approximately planar support area of the deck sheet and can extend lengthwise between a first member end disposed toward the first end of the plurality of deck wires of the deck sheet and a second member end disposed toward the second end of the plurality of deck wires of the deck sheet. The support member can include a support member wall with a first flange wall portion disposed along the first member end and a central wall portion extending from the first flange wall portion toward the second member end. The flange wall portion of the support member wall can include an end surface portion facing outwardly away from the second member end, a first flange surface portion disposed adjacent the end surface portion and a second flange surface portion disposed adjacent the end surface portion opposite the first flange surface portion. The end surface portion of the flange wall portion of the support member wall can be disposed in abutting engagement with the first and second inner tangential extents of the first and second edge wires.

Another example of a storage rack assembly in accordance with the subject matter of the present disclosure can be disposed on an associated base surface and can have a front side and a rear side. The storage rack assembly can include a storage rack structure and a storage deck section. The storage rack structure can include a plurality of columns and a plurality of beams extending between and interconnecting the plurality of columns such that a storage bay is formed at a non-zero height above the associated base surface. One of the plurality of beams can include an elongated open channel facing inward toward the storage bay. A storage deck section can be supported on the storage rack structure within the first storage bay. The storage deck section can include a deck sheet formed from a plurality of wires extending lengthwise between a first end and a second end opposite the first end. At least some of the plurality of wires can include a sheet portion at least partially defining an approximately planar support area of the deck sheet for supporting associated goods. A relief portion extending from the sheet portion in a direction toward the first end and at an acute angle relative to the approximately planar support area at least partially defined by the sheet portion of the plurality of wires. An extension portion can be disposed along the first end and oriented transverse to the sheet portion. The deck sheet can be secured to the one of the plurality of beams including the elongated open channel with at least part of the relief portion and at least part of the extension portion disposed within the elongated open channel of the one of the plurality of beams.

One example of a storage deck section in accordance with the subject matter of the present disclosure can be dimensioned for support on an associated storage rack structure. The storage deck section can include a deck sheet and a support member. The deck sheet can include a plurality of deck wires as well as first and second edge wires. The plurality of deck wires can extend lengthwise between a first end and a second end opposite the first end. At least some of the plurality of deck wires can include a sheet portion, a relief portion and an extension portion. The sheet portion can at least partially define an approximately planar support area of the deck sheet for supporting associated goods. The relief portion can extend from the sheet portion in a direction toward the first end and at an acute angle relative to the approximately planar support area at least partially defined by the sheet portion of the plurality of deck wires. The extension portion can be disposed along the first end and oriented transverse to the sheet portion. The first edge wire and the second edge wire can be spaced apart from one another in a lengthwise direction of the extension portion of the plurality of deck wires. The first and second edge wires can extend transverse to the sheet portion and the extension portion along at least the first end of the plurality of deck wires with the first and second edge wires extending between and interconnecting the extension portion of the plurality of deck wires. The support member can be disposed along at least the approximately planar support area of the deck sheet in a direction toward the extension portion of the plurality of deck wires. The support member can extend lengthwise between a first member end disposed toward the first end of the plurality of deck wires of the deck sheet and a second member end disposed toward the second end of the plurality of deck wires of the deck sheet. The support member can include a support member wall with a first flange wall portion disposed along the first member end and a central wall portion extending from the first flange wall portion toward the second member end. The flange wall portion of the support member wall can include an end surface portion facing outwardly away from the second member end and toward the first and second edge wires. The flange wall portion can also include a first flange surface portion disposed adjacent the end surface portion and a second flange surface portion disposed adjacent the end surface portion opposite the first flange surface portion.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
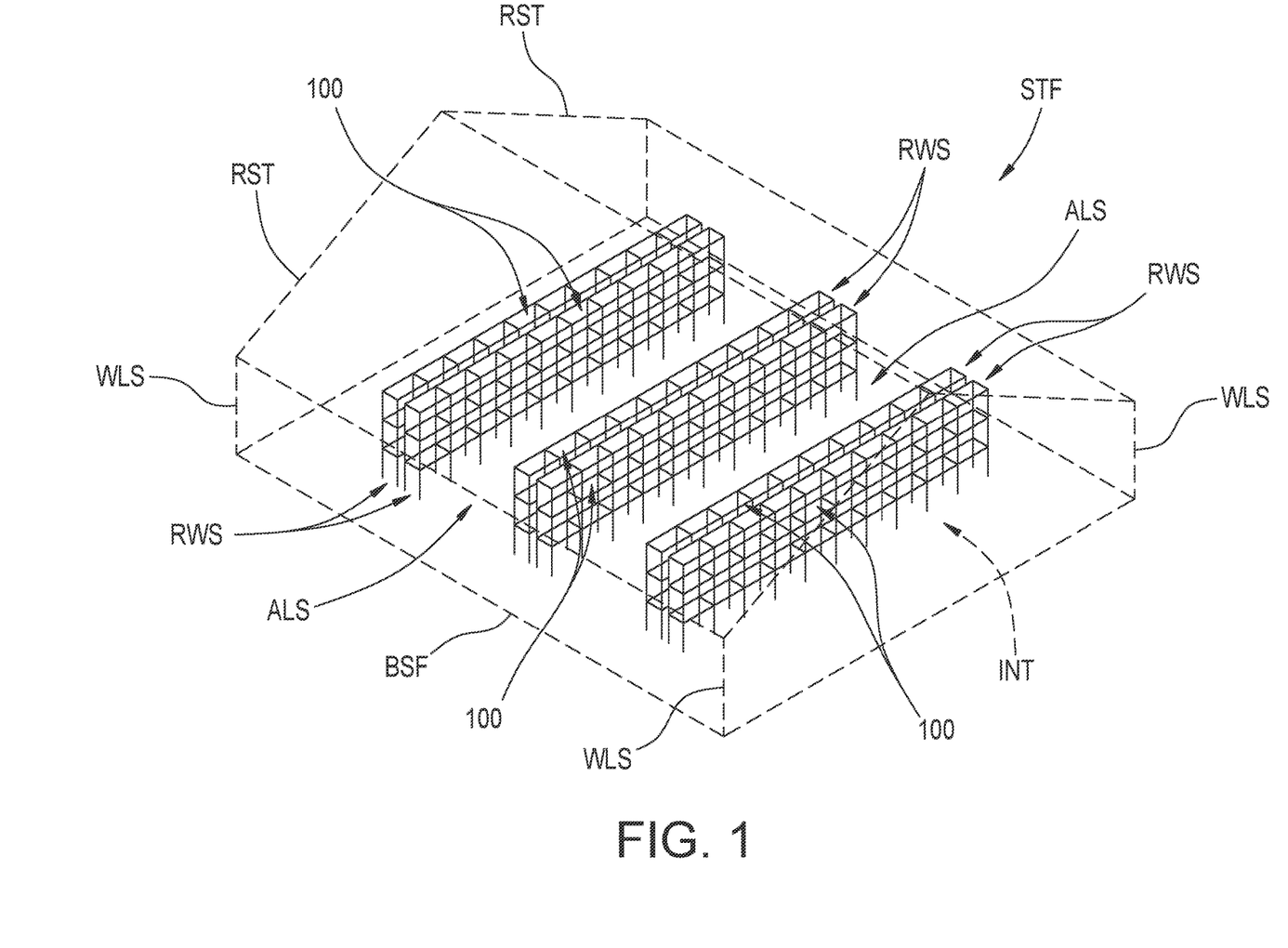
FIG. 1 is schematic representation of a storage facility including multiple rows of storage rack assemblies in accordance with the subject matter of the present disclosure.
Figure 2:
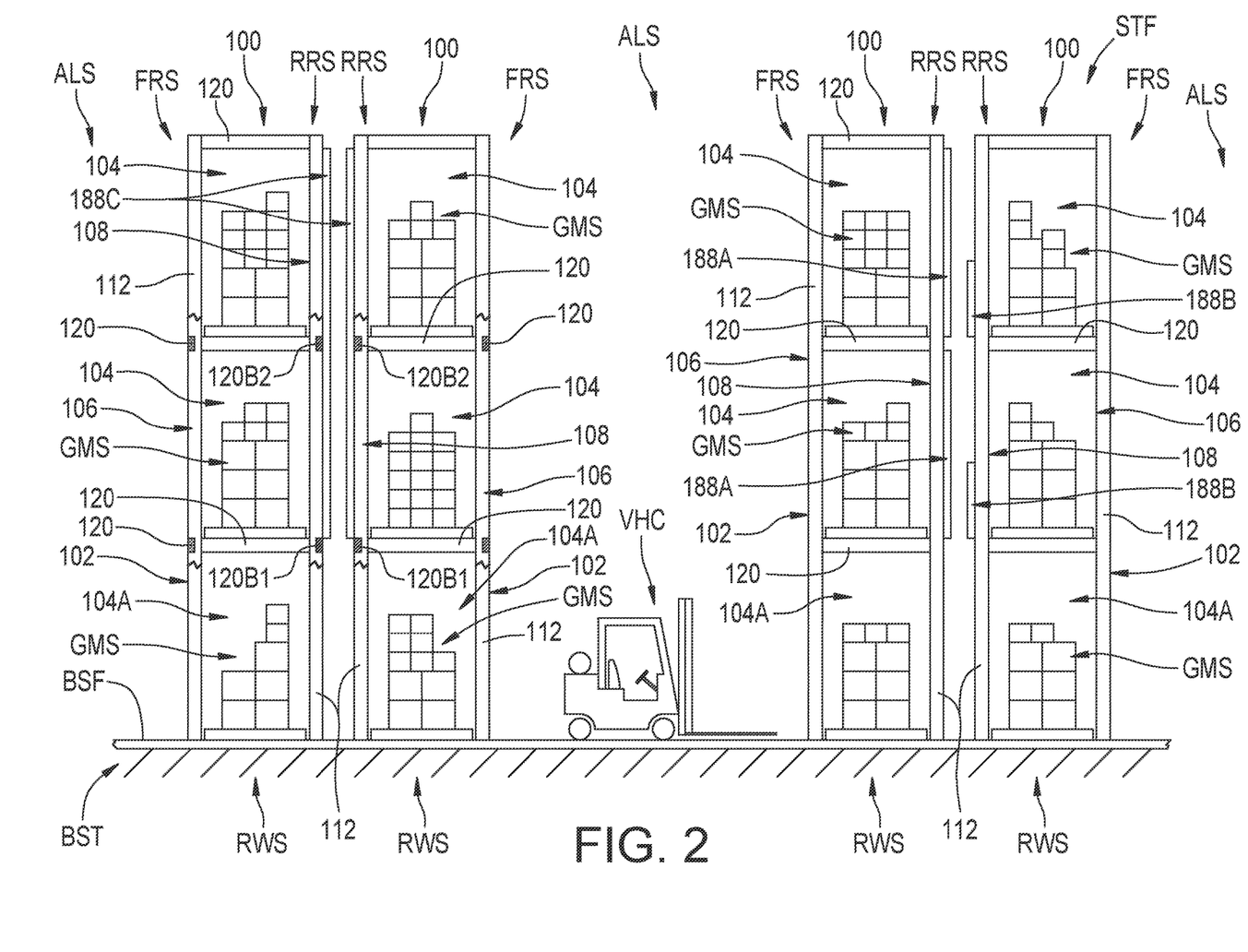
FIG. 2 is a side elevation view of a portion of the storage facility in FIG. 1 with rows of storage rack assemblies separated by an aisle.
Figure 3:
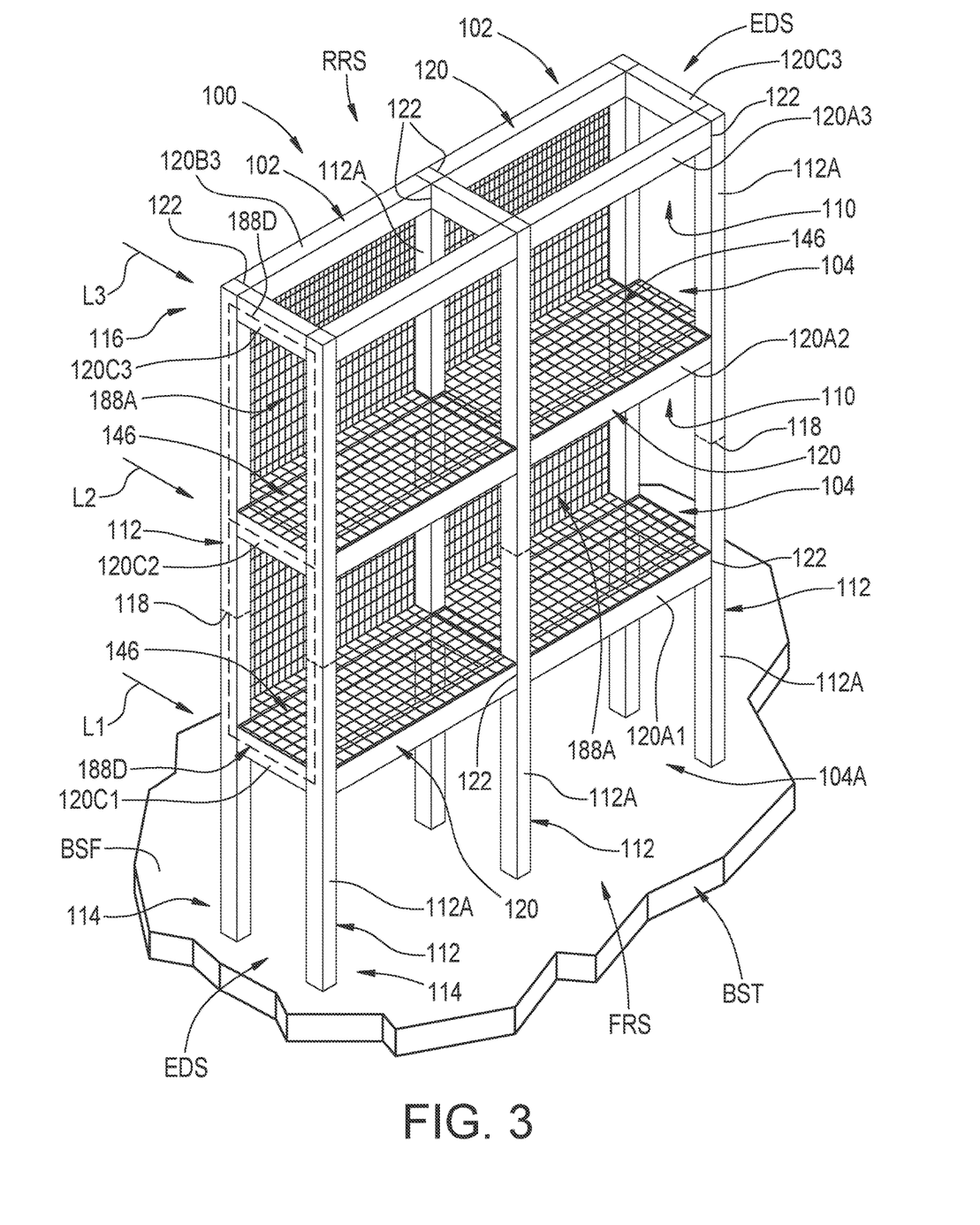
FIG. 3 is a top perspective view of one example of a plurality of storage rack assemblies in accordance with the subject matter of the present disclosure.

FIGS. 1-3 illustrate one example of a storage facility STF for short-term and/or long-term storage of goods and materials of a wide variety of types and kinds. Examples of such storage facilities can include enclosed storage facilities, such as warehouses, distribution centers and retail establishments as well as interior storage areas within or otherwise associated with manufacturing facilities, factories and plants and/or other industrial, commercial and/or retail spaces. Additional examples of storage facilities can include open-air storage facilities, such as covered and uncovered storage yards and/or other exterior areas associated with manufacturing facilities, factories and plants and/or other industrial, commercial and/or retail spaces. As such, it will be appreciated that the subject matter of the present disclosure is not intended to be limited to use in association with storage facilities of any particular type, kind, size and/or arrangement.

Storage facility STF is shown as including a base surface BSF on which one or more storage rack assemblies in accordance with the subject matter of the present disclosure can be supported. It will be appreciated that a base surface of any suitable type, kind and/or construction can be used. In many cases, the base surface will take the form of a prepared surface that is constructed and configured for vehicles to travel along and/or across. In some cases, such vehicles can include vehicles VHC (FIG. 2) constructed to lift and transport goods and materials, such as tow motors, forklifts (or forklift trucks), reach trucks, sideloaders and/or teletrucks, for example. Non-limiting examples of suitable base surfaces can include interior floors, exterior storage yards and other such areas. Base surfaces are commonly formed from a relatively hard and strong base material suitable for creating a relatively smooth and flat surface suitable for supporting one or more storage rack assemblies, the associated goods and materials stored thereon and any vehicles that may be used to transport the associated goods and materials on to, off of and/or otherwise between the storage rack assemblies and other areas. A non-limiting example of a material that may be suitable for use in forming a base surface can include steel-reinforced concrete. It will be appreciated, however, that other materials and/or constructions could alternately be used.

In the arrangement shown in FIGS. 1-3, storage facility STF is represented as taking the form of an interior storage facility that includes a base structure BST that at least partially forms base surface BSF. Storage facility STF can optionally include a roof structure RST that extends across at least a portion of base surface BSF. In some cases, the roof structure can be supported on base structure BST using one or more structural components and/or features, such as one or more columns, posts and/or walls, for example. In the arrangement shown in FIG. 1, for example, a plurality of walls WLS extend between base structure BST and roof structure RST, and at least partially enclose the storage facility to form an interior INT thereof.

A storage facility in accordance with the subject matter of the present disclosure, such as storage facility STF, for example, can include any suitable number of one or more storage rack assemblies. Additionally, it will be appreciated that such one or more storage rack assemblies in accordance with the subject matter of the present disclosure can be positioned, organized or otherwise arranged in any suitable manner relative to one another and/or any associated storage facility features (e.g., walls). In the arrangement shown in FIGS. 1 and 3, for example, a plurality of storage rack assemblies 100 are disposed in a plurality of rows RWS that are spaced apart from one another such that one or more aisles ALS are formed along one of the rows and/or between adjacent ones of a plurality of rows.

As indicated above, storage rack assemblies in accordance with the subject matter of the present disclosure can be positioned, organized or otherwise arranged in any suitable manner relative to one another such that goods and materials can be transferred into and out of, or otherwise onto and off of, the storage rack assemblies. It will be appreciated that storage rack assemblies are commonly arranged such that goods and materials are transferred into and out of, or otherwise onto and off of, the storage rack assemblies from a pre-established direction. As one example, storage rack assemblies 100 are shown as having a front (or front side) FRS and a rear (or rear side) RRS as well as one or more ends (or end sides) EDS. In some cases, storage rack assemblies 100 can be arranged end-to-end relative to one another to form rows RWS with front sides FRS facing a common direction and rear sides RRS facing the opposite direction. Additionally, in some cases, two storage rack assemblies 100 or rows of storage rack assemblies RWS can be arranged back-to-back such that front sides FRS thereof are accessible from along an aisle ALS. It will be appreciated, however, that other configurations and/or arrangements could alternately be used without departing from the subject matter of the present disclosure.

Storage rack assemblies 100 can include a storage rack structure 102 that at least partially defines one or more storage bays 104 disposed at a non-zero height above base surface BSF. In many cases, each storage rack structure 102 will include a base-level storage bay 104A that utilizes base surface BSF as the floor of the storage bay. Typically, each storage bay will include a front opening dimensioned for transferring goods and materials GMS (FIG. 2) into and out of, or otherwise onto and off of, storage rack assemblies 100. Additionally, each storage bay can include at least one of a rear opening and a side opening. In many cases, storage bays 104 will include a front opening 106, a rear opening 108 and at least one side opening 110. It will be appreciated, however, that other configurations, arrangements and/or constructions could alternately be used.

Storage rack structures 102 can be assembled or otherwise formed from any suitable combination of components, elements and/or assemblies. Additionally, it will be appreciated that such components, elements and/or assemblies can be formed from any suitable material or combination of materials. In many cases, various combinations of steel alloys are used. It will be appreciated, however, that other metals (e.g., aluminum) and/or other materials, such as non-metallic composites and/or metal/nonmetal composites, could alternately be used.

The storage rack structures can include a plurality of elevational support members and a plurality of cross members that extend between and operatively interconnect two or more of the elevational support members. It will be appreciated that the elevational support members and cross members can be of any suitable type, kind and/or construction. As shown in FIGS. 1-3, for example, the plurality of elevational support members can take the form of columns 112 that extends vertically between a bottom or base end 114 that is supported on base surface BSF and a distal or upper end 116 that is at a non-zero height or distance from base surface BSF. In some cases, the plurality of columns can extend substantially continuously between the base end and the upper end. In other cases, plurality of columns 112 can include a plurality of interconnected column sections 112A that can be operatively connected with one another in a suitable manner. As examples, each column could include two or more sections 112A that are secured to one another by way of a corresponding number of one or more mechanical and/or flowed-material joints, such as are represented in FIG. 3 by dashed lines 118.

Storage rack structures 102 can include any suitable number of two or more of columns or other elevational support members. In some cases, each of storage rack structures 102 can be formed from four columns that include two front columns disposed along front side FRS and two rear columns disposed along rear side RRS. In some constructions, each of storage rack structures 102 can be separately and individually formed from four columns with adjacent storage rack structures also including four separate columns. In other constructions, however, each storage rack structure can be formed from four columns with two columns (e.g., two left columns or two right columns) being common to adjacent storage rack structures, such as is illustrated in FIGS. 1-3, for example.

As indicated above, storage rack structures 102 can include a plurality of cross members that operatively interconnect two or more of the plurality of columns that form the storage rack structures. As shown in FIGS. 1-6, 9 and 10, the plurality of cross members can take the form of a plurality of rails or beams 120 that can be secured between columns 112 in any suitable manner. As examples, opposing ends of beams 120 can each be secured to a corresponding one of columns 112 by way of a mechanical and/or flowed-material joint, such as are represented in FIG. 3 by lines 122.

Plurality of beams 120 are assembled or otherwise secured onto columns 112 in groups or sets that together can at least partially define one or more of storage bays 104. In some cases, a given one of beams 120 may be common to two of storage bays 104, such as is shown in FIG. 3, for example. Storage rack structures 102 are shown in FIGS. 1-3 as including a plurality of levels disposed at increasing non-zero heights or distances from base surface BSF. In the arrangement shown, storage rack structures 102 include three discrete levels, which are identified by reference arrows L1, L2 and L3 in FIG. 3. It will be recognized that level L1 can at least partially define the top or upper extent of base-level storage bays 104A as well as a bottom or lower extent of storage bays 104 disposed between levels L1 and L2. Additionally, it will be recognized that level L2 can at least partially define the top or upper extent of storage bays 104 disposed between levels L1 and L2 as well as a bottom or lower extent of storage bays 104 disposed between levels L2 and L3. Furthermore, it will be recognized that level L3 can at least partially define the top or upper extent of storage bays 104 disposed between levels L2 and L3. It will be appreciated, however, that the foregoing description is merely one non-limiting example of a suitable construction and/or arrangement, and that other configurations could be used without departing from the subject matter of the present disclosure.

It will be appreciated that each level can include a plurality of beams 120. For example, the groups or sets of beams 120 that at least partially define each of levels L1-3 can include a corresponding one of front beams 120A1, 120A2 and 120A3 as well as a corresponding one of rear beams 120B1, 120B2 and 120B3. In a preferred arrangement, levels L1-3 can also include a corresponding one or more of side beams 120C1, 120C2 and 120C3. It will be recognized and understood, however, that additional structural features and/or components can also be used without departing from the subject matter of the present disclosure.

Figure 5:
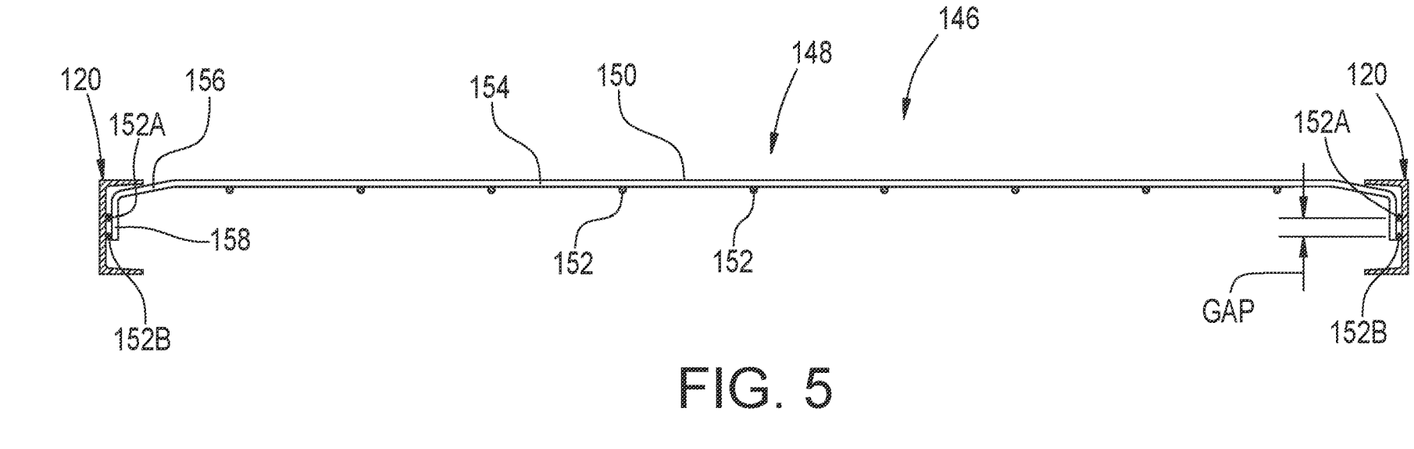
FIG. 5 is a cross-sectional side view of the exemplary storage deck in FIG. 4 taken from along line 5-5 in FIG. 4.
Figure 6:
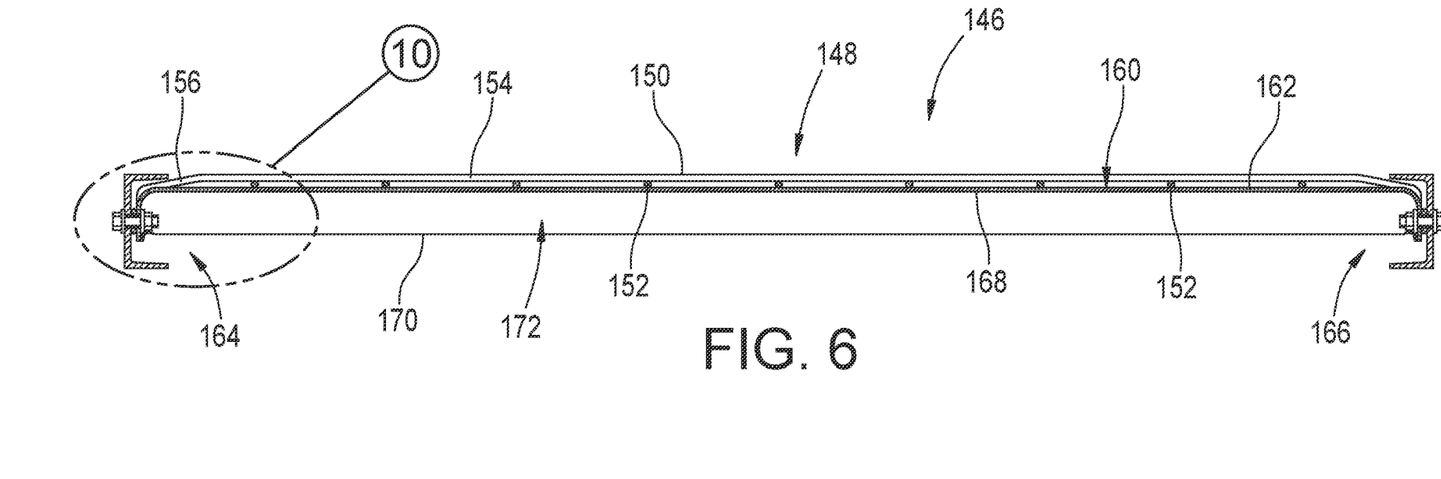
FIG. 6 is a cross-sectional side view of the exemplary storage deck in FIGS. 4 and 5 taken from along line 6-6 in FIG. 4.
Figure 10:
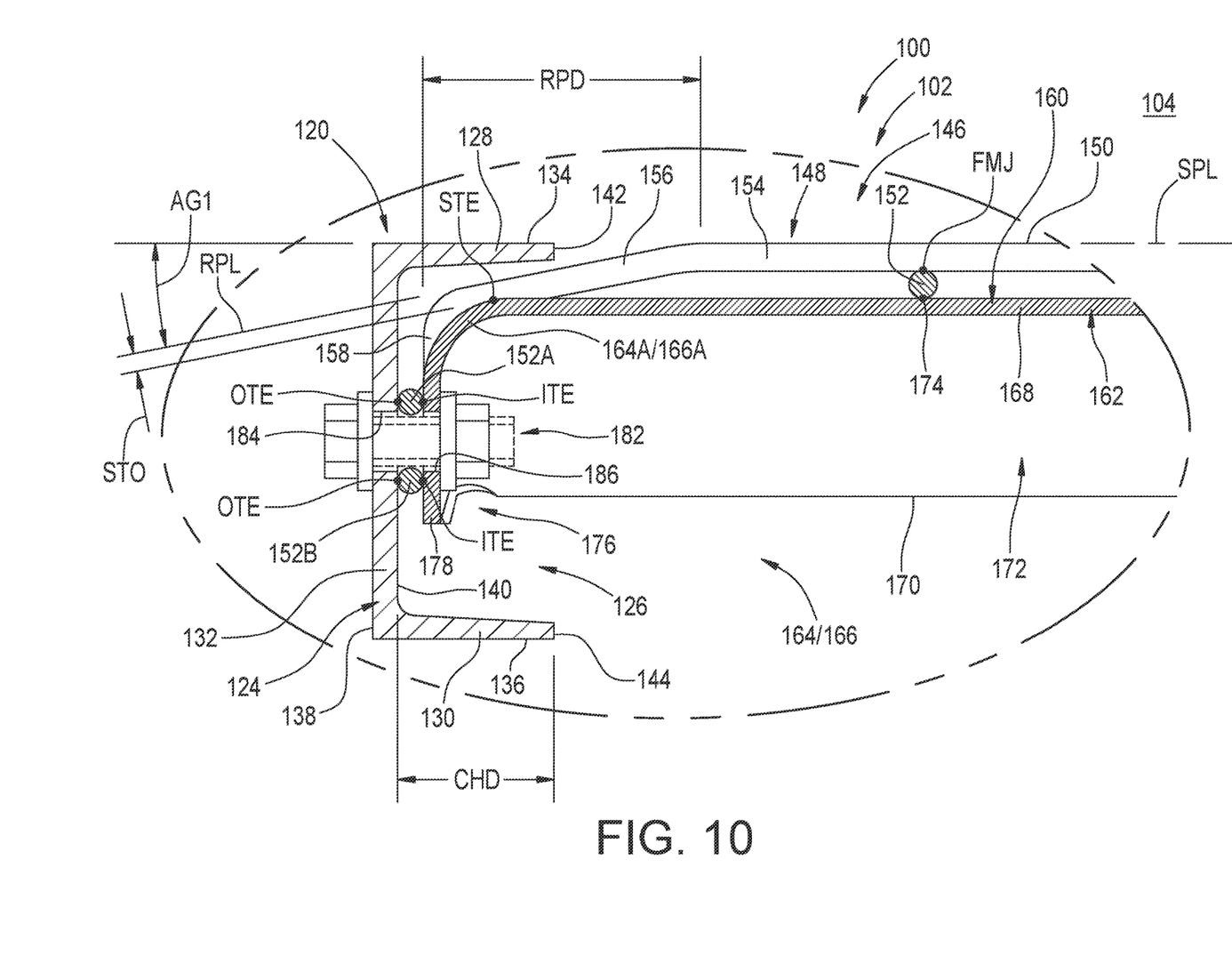
FIG. 10 is an enlarged view of the portion of the exemplary storage deck identified as Detail 10 in FIG. 6.

It will be appreciated that plurality of beams 120 can be of any suitable size, shape, type, kind, configuration and/or construction. For example, beams 120 can take the form of structural members having an approximately C-channel cross-sectional shape, such as is shown in FIGS. 5, 6 and 10, for example. As such, it will be appreciated that beams 120 can include any suitable combination of walls, wall portions, surfaces, surface portions and/or areas. For example, with further reference to FIG. 10, beams 120 can include a beam wall 124 that at least partially defines an elongated open channel 126. Beam wall 124 can include flange wall portions 128 and 130 with a web wall portion 132 extending therebetween. Beam wall 124 can also include a surface (or surface portion) 134 disposed along flange wall portion 128 as well as a surface (or surface portion) 136 disposed along flange wall portion 130 and facing opposite upper surface 134. A surface (or surface portion) 138 can extend along web wall portion 132 between surface portions 134 and 136. In some cases, surface portions 134, 136 and/or 138 can be approximately planar. A surface (or surface portion) 140 faces generally opposite surface portions 134, 136 and/or 138 to at least partially define elongated open channel 126. Elongated open channel 126 is formed by one or more portions of the beam wall from along end surfaces (or end surface portions) 142 and/or 144 to a channel depth, which is represented in FIG. 10 by reference dimension CHD.

Storage rack assemblies 100 can also include one or more storage deck sections 146 in accordance with the subject matter of the present disclosure. The storage deck sections can be supported on or along storage rack structure 102 in any suitable manner, such as on or along one or more of beams 120, for example. Storage decks 146 are constructed to function as at least a portion of the floor of the storage bay within which the storage deck section is installed. In such case, goods and materials GMS in palletized or unpalletized form can be positioned within storage bays 104 on storage deck sections 146 for long-term and/or short-term storage. It will be appreciated that storage deck sections 146 are configured to be supported on beams 120 in accordance with the subject matter of the present disclosure. It will be appreciated that storage decks 146 can be otherwise formed from any suitable materials or combinations of materials, such as metal materials (e.g., steel and/or aluminum) and/or polymeric materials (e.g., high-strength thermoplastic and/or fiber-reinforced thermoplastic materials).

One example of a suitable construction for storage deck sections 146 is shown in FIGS. 4-6, 9 and 10 as including a deck sheet 148 that is at least partially formed from a plurality of deck wires, such as may be formed from a metal material (e.g., a steel alloy). In some cases, the plurality of deck wires can be organized into a grid pattern with a first plurality of deck wires 150 disposed in a first orientation and a second plurality of deck wires 152 disposed in a second orientation that is transverse (e.g., approximately perpendicular) to the first orientation of the first plurality of deck wires. First plurality of deck wires 150 can be spaced apart from one another by a first deck offset dimension DOD1 that is approximately uniform between adjacent ones of deck wires 150. Second plurality of deck wires 152 can be spaced apart from one another by a second deck offset dimension DOD2 that is approximately uniform between adjacent ones of deck wires 152. In some cases, the first and second deck offset dimensions can be approximately equal to one another. In other cases, one of the first and second deck offset dimensions can be greater than the other of the first and second deck offset dimensions. In the arrangement shown in FIGS. 4-6, 9 and 10, for example, second deck offset dimension DOD2 is greater than first deck offset dimension DOD1. It will be appreciated, however, that other configurations could alternately be used.

Figure 4:
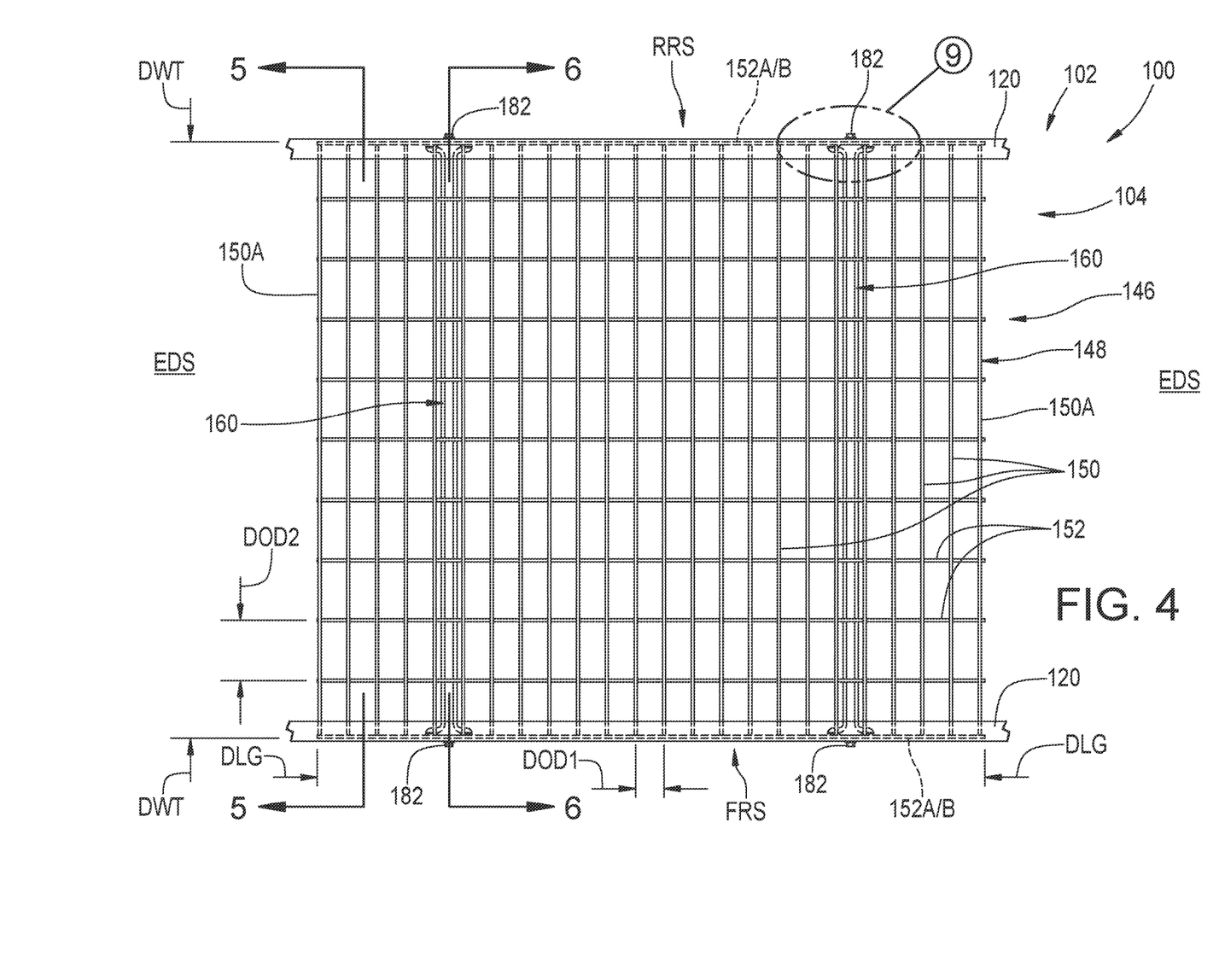
FIG. 4 is a top plan view of one example of a storage deck in accordance with the subject matter of the present disclosure shown assembled on a rack beam having a C-channel cross-sectional profile.

The plurality of deck wires can be operatively connected with one another in any suitable manner. As one example, first plurality of deck wires 150 can be supported in abutting engagement along second plurality of deck wires 152, and attached or otherwise secured thereto by way of flowed-material joints FMJ. In some cases, first plurality of deck wires 150 can include edge wires 150A that are the outermost wires of the plurality. Additionally, or in the alternative, second plurality of deck wires 152 can include edge wires 152A and 152B that are the outermost wires of the plurality. Edge wires 152A and 152B also include inner and outer tangential extents ITE and OTE (FIG. 10). Additionally, edge wires 150A, 152A and 152B can at least partially define an outer periphery of deck sheet 148. As such, it will be appreciated that storage deck sections 146 can, in some cases, extend between opposing edges that at least partially define a deck length and opposing edges that at least partially define a deck width, such as is represented in FIG. 4 by reference dimensions DLG and DWT, respectively.

In the arrangement shown in FIGS. 4-6, 9 and 10, deck wires 150 include sheet portions 154 that at least partially define a support surface of storage deck sections 146, which can be represented by a support plane SPL at least partially defined tangentially along or otherwise across at least sheet portions 154 of the deck wires. Deck wires 150 can also include relief portions 156 that extend outwardly beyond sheet portions 154 with a relief plane RPL at least partially defined tangentially along or otherwise across the relief portions of the deck wires. Deck wires 150 can further include extension portions 158 that extend from along relief portions in an orientation approximately transverse to sheet portions 154. In some cases, deck wires 152 can be disposed along a first or under side of deck wires 150 along sheet portions 154 and inward of relief portions 156 and/or extension portions 158. In such cases, edge wires 152A and/or 152B can, optionally, be disposed along a second or opposing side of deck wires 150 along the outside of extension portions 158. Additionally, in some cases, edge wires 152A and 152B can be disposed in spaced relation to one another in a heightwise direction such that an opening or gap GAP is disposed therebetween. In a preferred arrangement, relief portions 156 extend from along sheet portions 154 at an acute angle AG1 toward extension portions 158. Relief portions 156 can extend a distance RPD that is greater than channel depth CHD so that deck sections 146 can be supported on or along beams 120 with relief portions 156 and extension portions 158 at least partially disposed within elongated open channel 126 while sheet portions 154 and/or support plane SPL are disposed in approximate alignment with surface portions 134 of flange wall portions 128. Such a construction can permit deck sections 146 to be supported on beams 120 while minimizing or at least reducing differential height and/or surface discontinuities therebetween.

In some cases, one or more additional features and/or elements can be included on or along storage deck sections 146, such as may provide added strength and/or rigidity to the storage deck sections, for example. As one example, storage deck sections 146 can include one or more support channels 160 that can be secured on, along or otherwise across the plurality of deck wires of deck sheet 148. Together, one or more of deck sheets 148 and one or more of support channels 160 at least partially form deck sections 146. In the arrangement shown in FIGS. 4 and 6-10, for example, support channels 160 include a channel wall 162 that extends lengthwise between opposing ends 164 and 166. Channel wall 162 of support channels 160 can have an approximately U-shaped cross-sectional configuration with a central wall portion 168 that extends outwardly to channel edges 170 that at least partially define an open end 172 of support channels 160 that faces away from deck sheet 148. In a preferred arrangement, the central wall portion of support channels 160 can be disposed in abutting engagement with deck wires 152 and secured thereto by way of flowed-material joints 174 (FIG. 10). It will be appreciated, however, that other configurations and/or arrangements could alternately be used.

Figure 7:
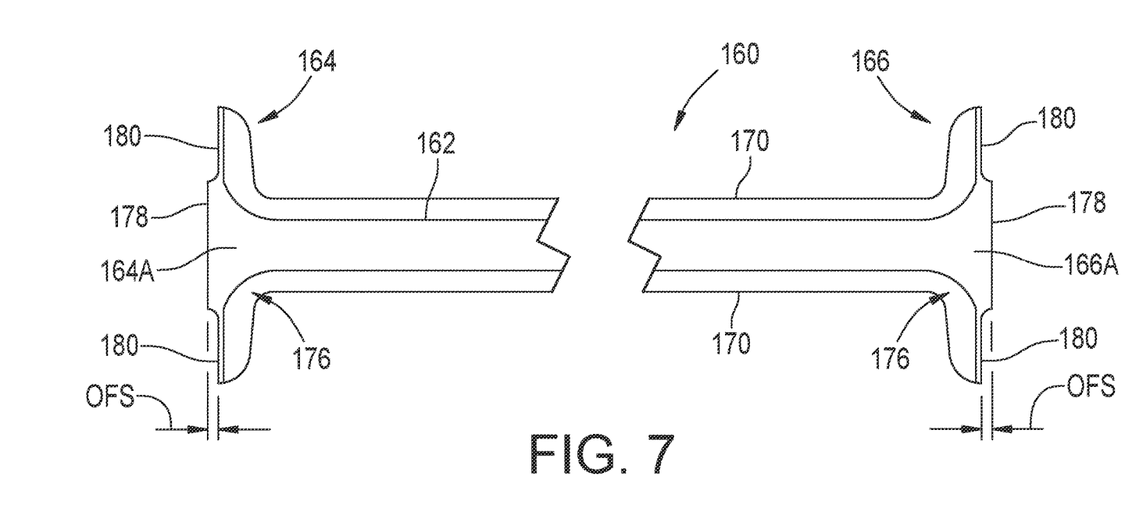
FIG. 7 is a top plan view of an exemplary support channel in accordance with the subject matter of the present disclosure, such as is shown in FIGS. 4 and 6.
Figure 8:
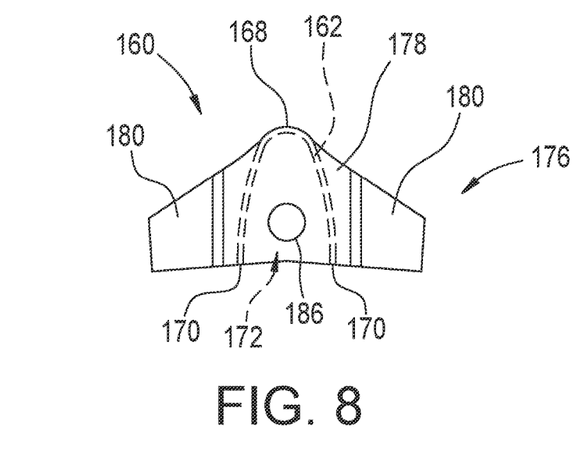
FIG. 8 is an end view of the exemplary support channel shown in FIGS. 4, 6 and 7.
Figure 9:
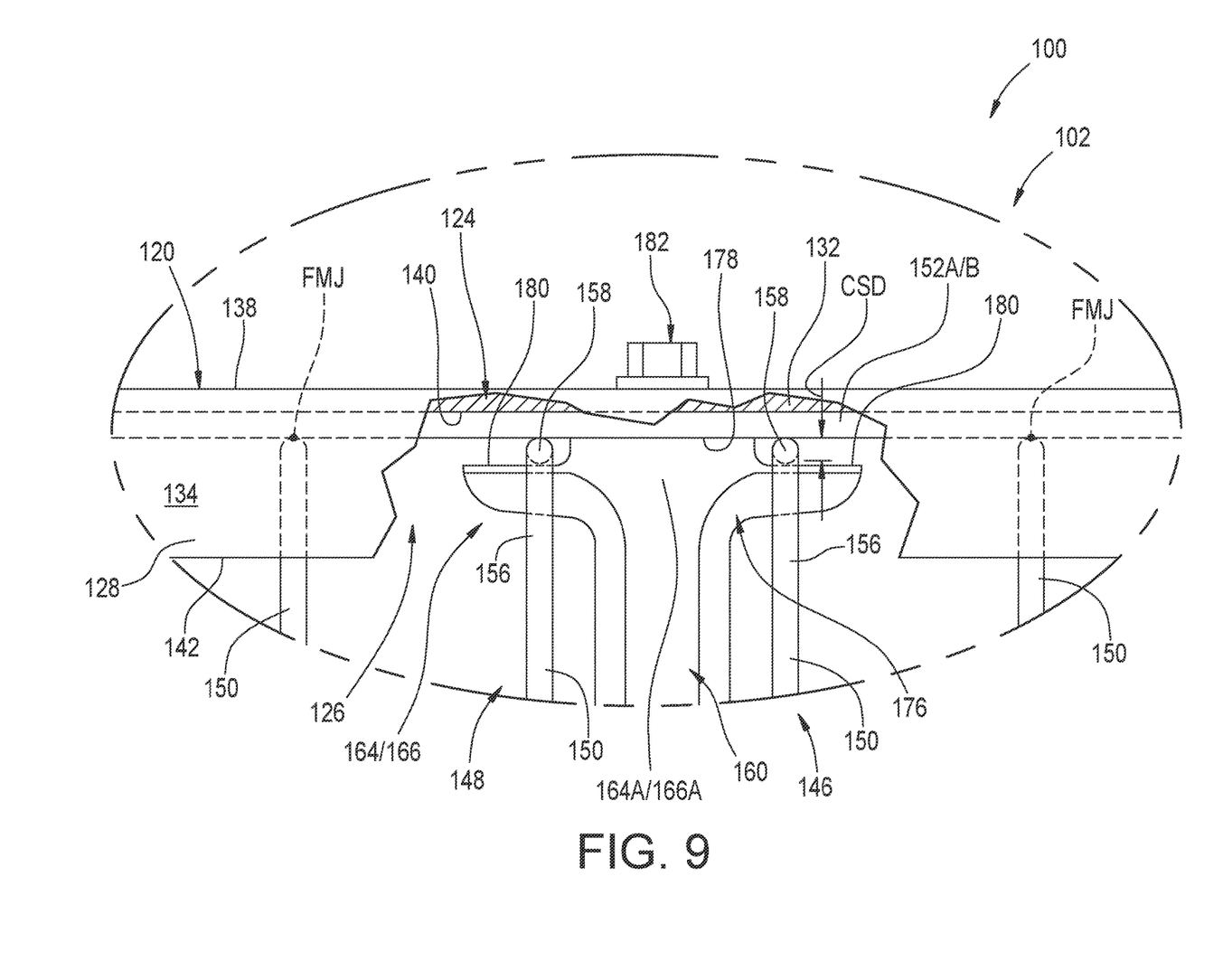
FIG. 9 is an enlarged view, in partial cross-section, of the portion of the exemplary storage deck identified as Detail 9 in FIG. 4.

Support channels 160 include flanges 176 disposed along ends 164 and 166 that transition from along central wall portion 168 at shoulder wall portions 164A and 166A, respectively. In an assembled condition, shoulder wall portions 164A and 166A can include a shoulder tangential extent STE that is disposed in approximately parallel but offset relation to relief plane RPL, as is represented in FIG. 10 by reference dimension STO. In such an arrangement, shoulder wall portions 164A and 166A are disposed beneath or otherwise along the under side of relief plane RPL. Flanges 176 include an end wall portion 178 facing outward and generally away from one another. Flanges 176 also include offset wall portions 180 that are spaced inwardly from end wall portions 178 such that opposing offset wall portions are closer together than opposing end wall portions of a given support channel, as is represented in FIG. 7 by offset dimensions OFS. In a preferred arrangement, offset dimensions OFS are greater than a cross-sectional dimension CSD (FIG. 9) of at least extension portions 158 of deck wires 150 such that extension portions 158 fit between offset wall portions 180 and edge wires 152A/152B in an assembled condition of storage rack assemblies 100 in which end wall portions 178 are disposed in abutting engagement with edge wires 152A and 152B, such as in tangential-contact engagement, for example. In a preferred arrangement, support channels 160 are positioned along and secured to deck sheets 148 such that shoulder wall portions 164A and/or 166A are disposed along relief plane RPL or spaced apart therefrom in a direction away from flange wall portion 128, such as is shown in FIG. 10, for example.

Securement devices 182, such as bolt, washer and nut combinations, for example, can extend through openings 184 in web wall portions 132 of beams 120, through gap GAP between edge wires 152A and 152B and then through openings 186 in end wall portion 178 of flanges 176 to secure deck sheets 148 and/or support channels 160 on or along beams 120. In one exemplary arrangement, a portion of surface 140 along web wall portion 132 can be disposed in abutting engagement with edge wires 152A and 152B, such as in tangential-contact engagement opposite end wall portion 178, for example. That is, edge wires 152A and 152B can be captured by securement device 182 between end wall portion 178 and web wall portion 132.

Storage rack assemblies can, optionally, include one or more barrier panel assemblies that are supported on or along the storage rack structure and extend across at least a portion of one of the storage bays thereof. It will be appreciated that the one or more barrier panel assemblies—if provided—can be captured, secured or otherwise retained on the storage rack structure in any suitable manner, such with or without the use of fasteners, flowed-material joints or other securement devices and/or features extending between or otherwise operatively connecting the barrier panel assemblies (or components thereof) to the storage rack structure (or components thereof).

As one example, barrier panel assemblies 188A are shown in FIGS. 2 and 3 extending across a substantial portion of rear openings 108 of storage bays 104 in both the vertical and horizontal directions. As another example, barrier panel assemblies 188B are shown in FIG. 2 as extending across a substantial portion of rear openings 108 in the horizontal direction while extending only partially across the rear openings in the vertical direction. As a further example, barrier panel assemblies 188C are shown in FIG. 2 as extending vertically between two storage bays 104. In such cases, barrier panel assemblies 188C can be dimensioned such that the barrier panel assemblies extend horizontally across approximately one-half of each of the two storage bays such that two of barrier panel assemblies 188C can be installed side-by-side to substantially-entirely cover the rear openings of both storage bays. As a further example, one or more barrier panel assemblies can extend across or otherwise at least partially cover at least a portion of one or more of side openings 110 of storage bays 104, such as are represented in FIG. 3 by dashed lines 188D.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A storage rack assembly disposed on an associated base surface and having a front side and a rear side, said storage rack assembly comprising:
    a storage rack structure including a plurality of columns and a plurality of beams extending between and interconnecting said plurality of columns such that a storage bay is formed at a non-zero height above the associated base surface with one of said plurality of beams including an uppermost surface portion and an elongated open channel with an inner surface portion facing inward toward said storage bay; and,
    a storage deck section supported on said storage rack structure within said first storage bay, said storage deck section including:
    a deck sheet including:
        a plurality of deck wires extending lengthwise between a first end and a second end opposite said first end with at least some of said plurality of deck wires including:
            a sheet portion at least partially defining an approximately planar support area for supporting associated goods with said approximately planar support area disposed in approximate alignment with said uppermost surface portion of said one of said plurality of beams;
            a relief portion extending from said sheet portion in a direction toward said first end and at an acute angle relative to said approximately planar support area at least partially defined by said sheet portion of said plurality of deck wires; and,
            an extension portion disposed along said first end and oriented transverse to said sheet portion with substantially all of said extension portion along said first end of said plurality of deck wires is disposed within said elongated open channel of said one of said plurality of beams; and,
        a first edge wire and a second edge wire spaced apart from said first edge wire in a lengthwise direction of said extension portion of said plurality of deck wires, said first and second edge wires extending transverse to said sheet portion and said extension portion along at least said first end of said plurality of deck wires with said first and second edge wires extending between and interconnecting said extension portion of said plurality of deck wires, said first edge wire including a first outer tangential extent and a first inner tangential extent, and said second edge wire including a second outer tangential extent and a second inner tangential extent with said first and second outer tangential extents of said first and second edge wires disposed in abutting engagement with said inner surface portion of said elongated open channel of said one of said plurality of beams; and,
    a support member disposed below at least said approximately planar support area of said deck sheet and extending lengthwise between a first member end disposed toward said first end of said plurality of deck wires of said deck sheet and a second member end disposed toward said second end of said plurality of deck wires of said deck sheet, said support member including a support member wall with a first flange wall portion disposed along said first member end and a central wall portion extending from said first flange wall portion toward said second member end, said first flange wall portion of said support member wall including an end surface portion facing outwardly away from said second member end, a first flange surface portion disposed adjacent said end surface portion and a second flange surface portion disposed adjacent said end surface portion opposite said first flange surface portion with said end surface portion of said flange wall portion of said support member wall disposed in abutting engagement with said first and second inner tangential extents of said first and second edge wires.

2. A storage rack assembly disposed on an associated base surface and having a front side and a rear side, said storage rack assembly comprising:
a storage rack structure including a plurality of columns and a plurality of beams extending between and interconnecting said plurality of columns such that a storage bay is formed at a non-zero height above the associated base surface with one of said plurality of beams including an elongated open channel facing inward toward said storage bay; and,
a storage deck section supported on said storage rack structure within said storage bay, said storage deck section including a deck sheet formed from a plurality of deck wires, a first edge wire and a second edge wire, said plurality of deck wires extending lengthwise between a first end and a second end opposite said first end with at least some of said plurality of deck wires including:
a sheet portion at least partially defining an approximately planar support area of said deck sheet for supporting associated goods;
a relief portion extending from said sheet portion in a direction toward said first end and at an acute angle relative to said approximately planar support area at least partially defined by said sheet portion of said plurality of wires; and,
an extension portion disposed along said first end and oriented transverse to said sheet portion;
said first edge wire extending transverse to said sheet portion and said extension portion along at least said first end of said plurality of deck wires with said first edge wire extending between and interconnecting said extension portion of said plurality of deck wires;
said second edge wire extending transverse to said sheet portion and said extension portion along at least said first end of said plurality of deck wires with said second edge wire extending between and interconnecting said extension portion of said plurality of deck wires and spaced apart from said first edge wire in a lengthwise direction of said extension portion of said plurality of deck wires; and,
said deck sheet being secured to said one of said plurality of beams including said elongated open channel with at least part of said relief portion and at least part of said extension portion disposed within said elongated open channel of said one of said plurality of beams.

3. A storage rack assembly according to claim 2, wherein said deck sheet has a sheet width and a sheet length, and said plurality of deck wires includes:
a first plurality of deck wires disposed in spaced relation to one another in a direction of said sheet length; and,
a second plurality of deck wires oriented transverse to said first plurality of wires and disposed in spaced relation to one another in a direction of said sheet width.

4. A storage rack assembly according to claim 2, wherein two or more of said plurality of beams include an elongated open channel formed therealong that extends inward toward said storage bay.

5. A storage rack assembly according to claim 2, wherein substantially all of said extension portion along said first end of said plurality of deck wires is disposed within said elongated open channel of said one of said plurality of beams.

6. A storage rack assembly according to claim 2, wherein at least a portion of said first edge wire is disposed within said elongated open channel of said one of said plurality of beams.

7. A storage rack assembly according to claim 2, wherein at least a portion of said second edge wire is disposed within said elongated open channel of said one of said plurality of beams.

8. A storage rack assembly according to claim 2, wherein said elongated open channel of said one of said plurality of beams includes an inner surface portion disposed within said elongated open channel, and said first edge wire includes a first outer tangential extent and said second edge wire includes a second outer tangential extent with said first and second outer tangential extents of said first and second edge wires disposed in abutting engagement with said inner surface portion of said elongated open channel of said one of said plurality of beams.

9. A storage rack assembly disposed on an associated base surface and having a front side and a rear side, said storage rack assembly comprising:
a storage rack structure including a plurality of columns and a plurality of beams extending between and interconnecting said plurality of columns such that a storage hay is formed at a non-zero height above the associated base surface with one of said plurality of beams including an elongated open channel facing inward toward said storage bay; and,
a storage deck section supported on said storage rack structure within said storage bay, said storage deck section including a deck sheet and a support member, said deck sheet formed from a plurality of wires extending lengthwise between a first end and a second end, said support member extending lengthwise between a first member end disposed toward said first end of said plurality of wires of said deck sheet and a second member end disposed toward said second end of said plurality of wires of said deck sheet, said support member including a support member wall with a first flange wall portion disposed along said first member end and a central wall portion extending from said first flange wall portion toward said second member end, at least some of said plurality of wires including:
a sheet portion at least partially defining an approximately planar support area of said deck sheet for supporting associated goods;
a relief portion extending from said sheet portion in a direction toward said first end and at an acute angle relative to said approximately planar support area at least partially defined by said sheet portion of said plurality of wires; and,
an extension portion disposed along said first end and oriented transverse to said sheet portion;
said deck sheet secured to said one of said plurality of beams including said elongated open channel with at least part of said relief portion and at least part of said extension portion disposed within said elongated open channel of said one of said plurality of beams.

10. A storage rack assembly according to claim 9, wherein said support member is one of a plurality of support members disposed below at least said approximately planar support area of said deck sheet and operable to at least partially support said deck sheet on said rack structure.

11. A storage rack assembly according to claim 9, wherein said support member wall includes a second flange wall portion disposed along said second member end.

12. A storage rack assembly according to claim 9, wherein said flange wall portion of said support member wall includes an end surface portion facing outwardly away from said second member end, a first flange surface portion disposed adjacent said end surface portion and a second flange surface portion disposed adjacent said end surface portion opposite said first flange surface portion.

13. A storage rack assembly according to claim 12, wherein said extension portions of said plurality of wires have an approximately common nominal cross-sectional dimension, and said first and second flange surface portions are offset from said end surface portion in a direction toward said second member end by a distance greater than said nominal cross-sectional dimension of said extension portions of said plurality of wires.

14. A storage rack assembly according to claim 13, wherein said deck sheet includes a first edge wire and a second edge wire spaced apart from said first edge wire in a lengthwise direction of said extension portion of said plurality of wires, said first and second edge wires extending transverse to said sheet portion and said extension portion along at least said first end of said plurality of wires with said first and second edge wires extending between and interconnecting said extension portion of said plurality of wires.

15. A storage rack assembly according to claim 14, wherein said first edge wire includes a first inner tangential extent and said second edge wire includes a second inner tangential extent with said end surface portion of said flange wall portion of said support member wall disposed in abutting engagement with said first and second inner tangential extents of said first and second edge wires.

16. A storage rack assembly according to claim 9, wherein said support member wall includes a first shoulder wall portion extending between and interconnecting said first flange wall portion and said central wall portion, said first shoulder wall portion including a first outer shoulder surface portion.

17. A storage rack assembly according to claim 16, wherein said relief portions of said plurality of wires at least partially define an approximately planar relief area extending at said acute angle relative to said approximately planar support area and into said elongated open channel of said one of said plurality of beams with a tangential extent of said first outer shoulder surface portion disposed in offset alignment with said approximately planar relief area.

18. A storage deck section dimensioned for support on an associated storage rack structure, said storage deck section comprising:
   a deck sheet including:
      a plurality of deck wires extending lengthwise between a first end and a second end opposite said first end with at least some of said plurality of deck wires including:
         a sheet portion at least partially defining an approximately planar support area for supporting associated goods;
         a relief portion extending from said sheet portion in a direction toward said first end and at an acute angle relative to said approximately planar support area at least partially defined by said sheet portion of said plurality of deck wires; and,
         an extension portion disposed along said first end and oriented transverse to said sheet portion; and,
     a first edge wire and a second edge wire spaced apart from said first edge wire in a lengthwise direction of said extension portion of said plurality of deck wires, said first and second edge wires extending transverse to said sheet portion and said extension portion along at least said first end of said plurality of deck wires with said first and second edge wires extending between and interconnecting said extension portion of said plurality of deck wires; and,
   a support member disposed along at least said approximately planar support area of said deck sheet in a direction toward said extension portion of said plurality of deck wires and extending lengthwise between a first member end disposed toward said first end of said plurality of deck wires of said deck sheet and a second member end disposed toward said second end of said plurality of deck wires of said deck sheet, said support member including a support member wall with a first flange wall portion disposed along said first member end and a central wall portion extending from said first flange wall portion toward said second member end, said flange wall portion of said support member wall including an end surface portion facing outwardly away from said second member end and toward said first and second edge wires, a first flange surface portion disposed adjacent said end surface portion and a second flange surface portion disposed adjacent said end surface portion opposite said first flange surface portion.

19. A storage deck section according to claim 18, wherein said extension portions of said plurality of deck wires have an approximately common nominal cross-sectional dimension, and said first and second flange surface portions are offset from said end surface portion in a direction toward said second member end by a distance greater than said nominal cross-sectional dimension of said extension portions of said plurality of wires.

20. A storage deck section according to claim 19, wherein said first edge wire includes a first inner tangential extent and said second edge wire includes a second inner tangential extent with said end surface portion of said flange wall portion of said support member wall disposed in abutting engagement with said first and second inner tangential extents of said first and second edge wires.

\* \* \* \* \*